(12) United States Patent
Degtiarenko

(10) Patent No.: US 8,334,523 B1
(45) Date of Patent: Dec. 18, 2012

(54) MOVING CORE BEAM ENERGY ABSORBER AND CONVERTER

(75) Inventor: Pavel V. Degtiarenko, Williamsburg, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 853 days.

(21) Appl. No.: 12/286,989

(22) Filed: Oct. 3, 2008

(51) Int. Cl.
*G02B 5/00* (2006.01)
*G21K 1/00* (2006.01)
*H01J 1/52* (2006.01)
*H01J 3/00* (2006.01)
*H01J 5/18* (2006.01)
*H01J 29/46* (2006.01)

(52) U.S. Cl. ....... 250/505.1; 165/47; 165/185; 165/80.1

(58) Field of Classification Search ............... 250/505.1; 165/47, 185, 80.1
See application file for complete search history.

(56) References Cited

U.S. PATENT DOCUMENTS

| 6,604,575 B1 * | 8/2003 | Degtiarenko | 165/185 |
| 6,904,957 B1 * | 6/2005 | Degtiarenko | 165/47 |
| 2009/0199997 A1 * | 8/2009 | Koplow | 165/80.3 |

* cited by examiner

*Primary Examiner* — Jack Berman
*Assistant Examiner* — Meenakshi Sahu

(57) ABSTRACT

A method and apparatus for the prevention of overheating of laser or particle beam impact zones through the use of a moving-in-the-coolant-flow arrangement for the energy absorbing core of the device. Moving of the core spreads the energy deposition in it in 1, 2, or 3 dimensions, thus increasing the effective cooling area of the device.

12 Claims, 10 Drawing Sheets

US 8,334,523 B1

MOVING CORE BEAM ENERGY ABSORBER AND CONVERTER

The United States of America may have certain rights to this invention under Management and Operating Contract DE-AC05-06OR23177 from the United States Department of Energy.

FIELD OF THE INVENTION

The present invention relates to the absorption of particle or laser beam energy in targets, converters and beam dumps and more particularly, to significantly more efficient such devices and their mode of operation.

BACKGROUND OF THE INVENTION

The efficient absorption and dissipation of particle or laser beam energy deposited during particle accelerator, or laser beam energy absorption in targets, converters, beam absorbers, and beam dumps is necessary in many commercial and research accelerator and laser installations. Engineering solutions aimed at solving this problem and available on the market today generally suggest setups in which the absorption of beam energy occurs in stationary elements immersed in the flow of liquid or gaseous coolants. In many instances, such stationary design imposes limitations on the maximum beam power ratings of the devices. Energy concentrations in the particle and laser beams can be very high, such that the local power deposited in the absorber cannot be dissipated fast enough over the correspondingly large cooling area needed to transfer the energy to the coolant flow at an adequate rate.

One method proposed for dealing with this problem is the use of beam rastering, that is, rapid changing of the beam position at the entrance point to the absorber, thereby effectively increasing the cooling area. Such a method is widely used in particle accelerators, but it is increasingly difficult and expensive as higher energies and higher beam power are attained.

Another method of high energy beam absorption is to make the flowing coolant the major energy absorber, with the stationary absorber structures fabricated from a thin, low absorbing material, such as transparent glass for laser beams, or a low-Z material for particle beams. For a very high beam power this method still has the problem of dissipating the heat produced in the stationary elements of the absorber. For high energy particle accelerator beams such a method brings the additional problem of dealing with radioactive coolant. When a significant portion of the beam energy is absorbed by the coolant, a correspondingly significant portion of the activated material is concentrated in the coolant volume. Making such an arrangement safe and reliable results in significant cost increases.

Thus, there remains a need for an efficient and cost effective apparatus and method for absorbing and/or disposing of particle accelerator, or laser beam energy produced in targets, converters, beam absorbers, and beam dumps.

OBJECT OF THE INVENTION

It is therefore an object of the present invention to provide a highly efficient and cost effective method and apparatus for absorbing and/or disposing of particle accelerator, or laser beam energy produced in targets, converters, beam absorbers, and beam dumps.

SUMMARY OF THE INVENTION

The method and apparatus of the present invention prevent overheating of laser or particle beam impact zones through the use of a moving-in-the-coolant-flow arrangement of an energy absorbing core. Moving of the core spreads the energy deposition in the core in 1, 2, or 3 dimensions, thus increasing the effective cooling area of the device.

DETAILED DESCRIPTION

Figure 1:
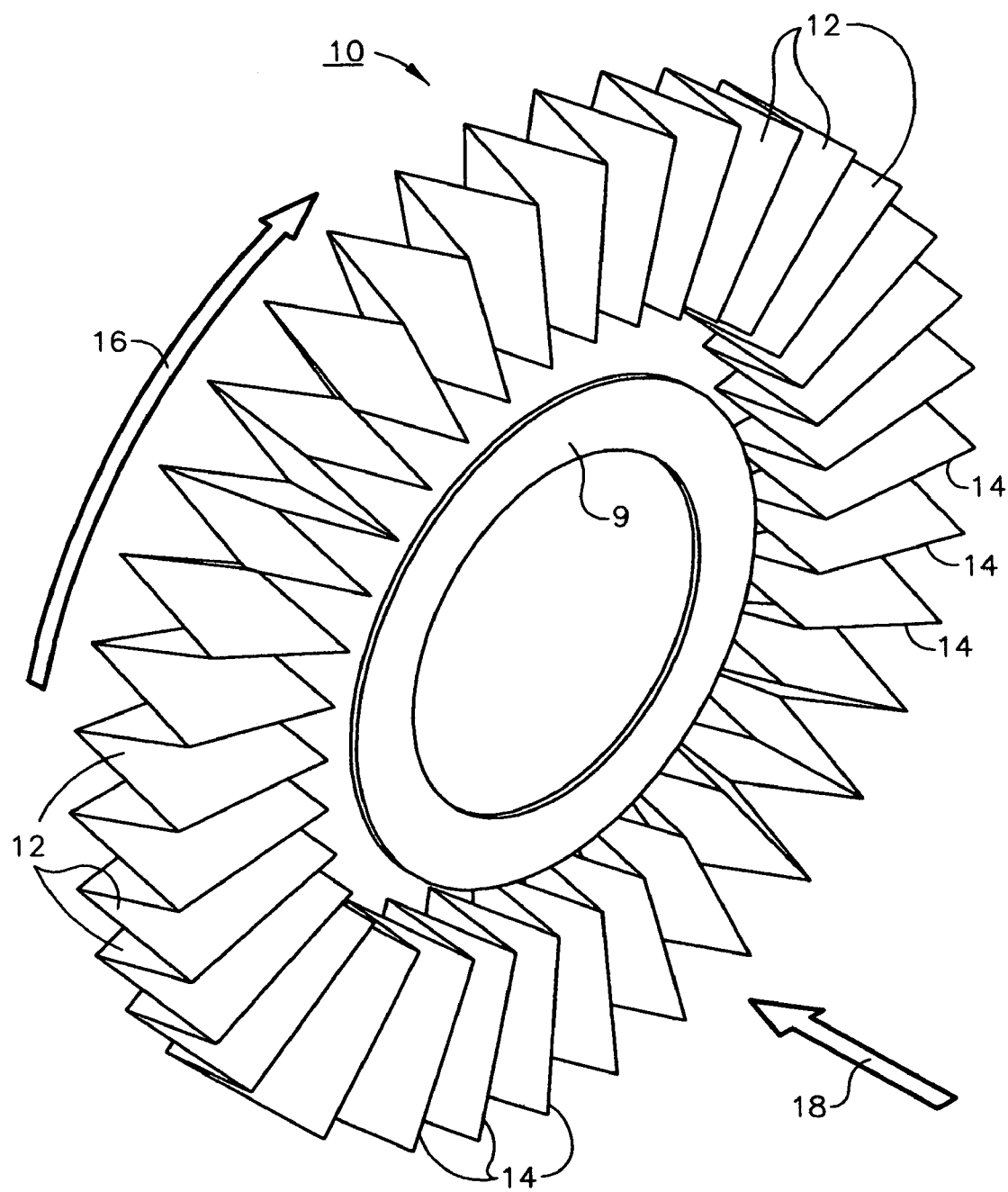
FIG. 1 is a perspective view of one preferred embodiment of the moving core energy absorber of the present invention.

Referring now to the accompanying drawings, FIG. 1 depicts a moving core energy absorber 10 suitable for the absorption of laser or low energy particle beam energy in accordance with the present invention. As shown in FIG. 1, according to this embodiment the laser energy absorber 10 is a ring-shaped assembly of sharp-edged laser light absorbing and thermoconductive plates 12 connected to each other at their edges 14 to form a zigzag shape or pleated ring. Laser light absorbing and thermoconductive plates 12 are attached to a core 9 at their bases. Sharp edges 14 minimize laser light back reflection from energy absorber 10. Rotation of energy absorber 10 about its axis as indicated by arrow 16 exposes all plates to incoming laser beam 18 consecutively and uniformly along their center line. In this configuration, the thermally conductive plates 12 distribute heat generated therein by the impact of laser beam 18 over a significantly large cooled area. Additionally, the rotation of energy absorber 10 causes centrifugal flow of air flow between plates 12 in an outward direction, providing a heat exchange or dissipation mechanism. The number of the plates 12 in the core, their dimensions, the rotation speed, means to hold them in place, and means to bring them into motion are dictated by the application. Other methods of creating the light-absorbing medium in the moving core are possible. In particular, a design with tightly packed parallel sharp needles, or a design using "carbon wool" material (tightly packed thin carbon fibers) in place of the sharp plates can provide even smaller back-reflectivity from the surface while still providing spread of the beam heat impact around the area.

Figure 2:
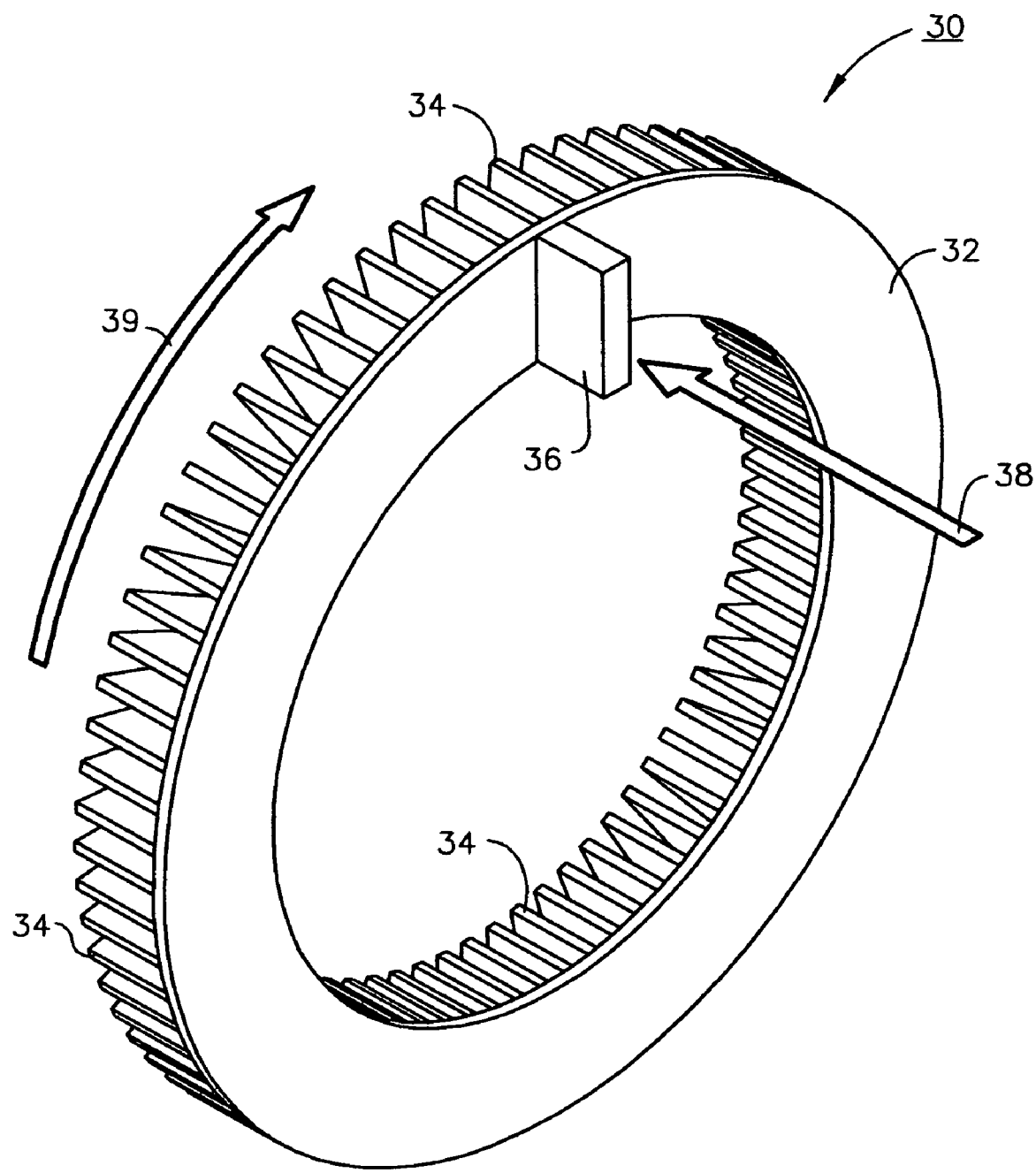
FIG. 2 is a perspective view of an alternate preferred embodiment of the moving core energy absorber of the present invention.

FIG. 2 depicts a second alternative preferred embodiment of the energy absorber of the present invention. As shown in FIG. 2, this alternative energy absorber 30 comprises a generally planar ring 32 having a series of fins 34 extending orthogonally from one generally planar surface thereof and a laser light absorbing layer 36 extending orthogonally from the opposing generally planar surface of generally planar ring 32. In FIG. 2, only a small section of laser light absorbing layer 36 is shown, but it is apparent that this later should extend about the entire periphery of generally planar ring 32. In this embodiment, laser light from laser beam impacts laser light absorbing layer 36 and heat generated by such impact is transferred to fins 34 where it is dissipated. Rotation of energy absorber 30 in the direction indicated by arrow 39 exposes a continuously different portion of the surface of laser light absorbing layer 36 to laser beam 38 and such rotation provides for the circulation of air or another coolant about fins 34 to dissipate heat transferred thereto.

Similar to the case of laser power absorption, targets and beam converters used in particle accelerator installations sometimes are required to absorb a significant portion of the beam power and, thus, require cooling. Implementation of the moving core solution in such devices serves the same purpose of allowing more effective heat transfer, higher power, and more compact design. In particular, absorbers 10 and 30 as discussed hereinabove, can be used to absorb low energy accelerated particle beams, if the material thickness in the absorbers is sufficient to stop the accelerated particles.

Figure 3:
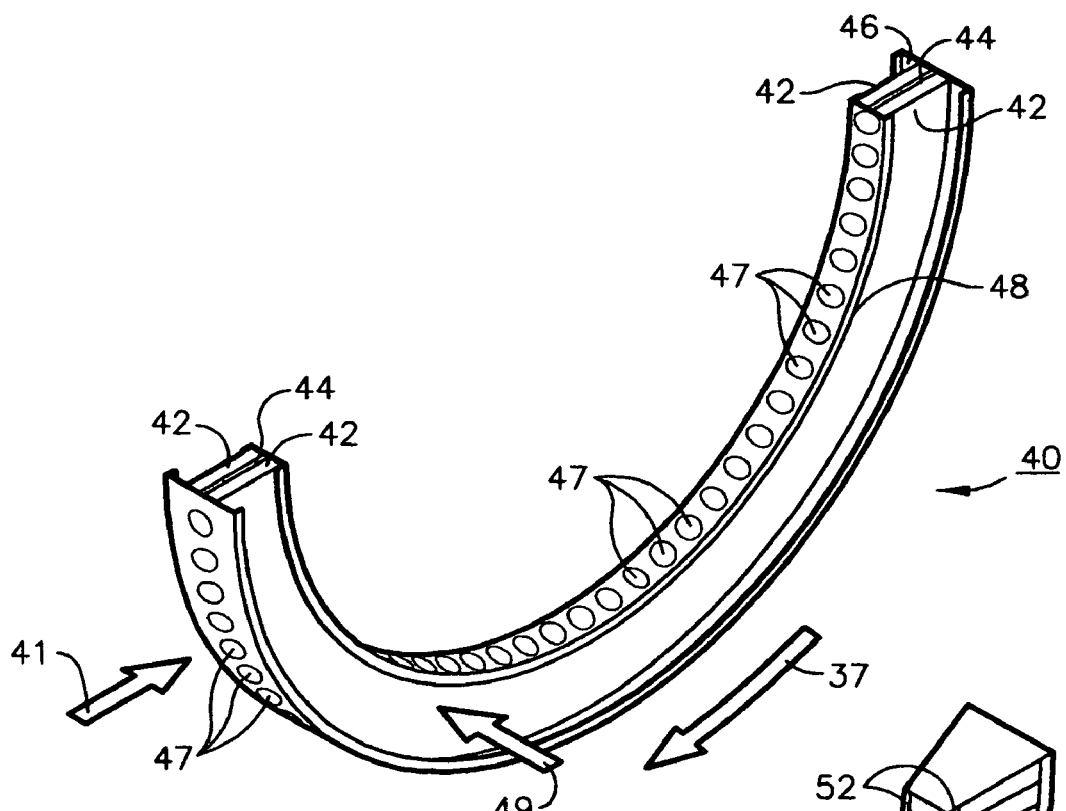
FIG. 3 is a perspective sectional view of yet another preferred embodiment of the moving core energy absorber of the present invention specifically aimed at the absorption of particle beam energy.
Figure 4:
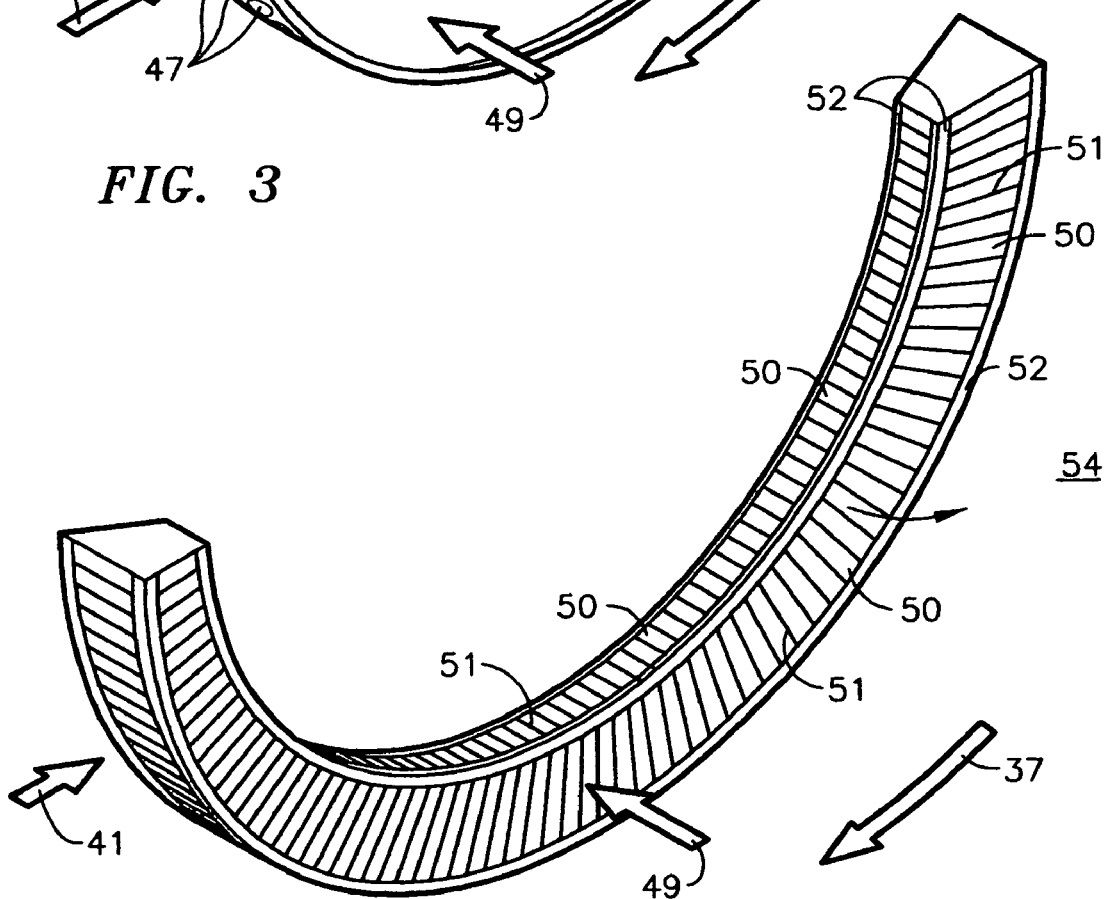
FIG. 4 is a perspective sectional view of a further preferred embodiment of a moving core energy absorber suitable for the absorption of particle beam energy.
Figure 3A:
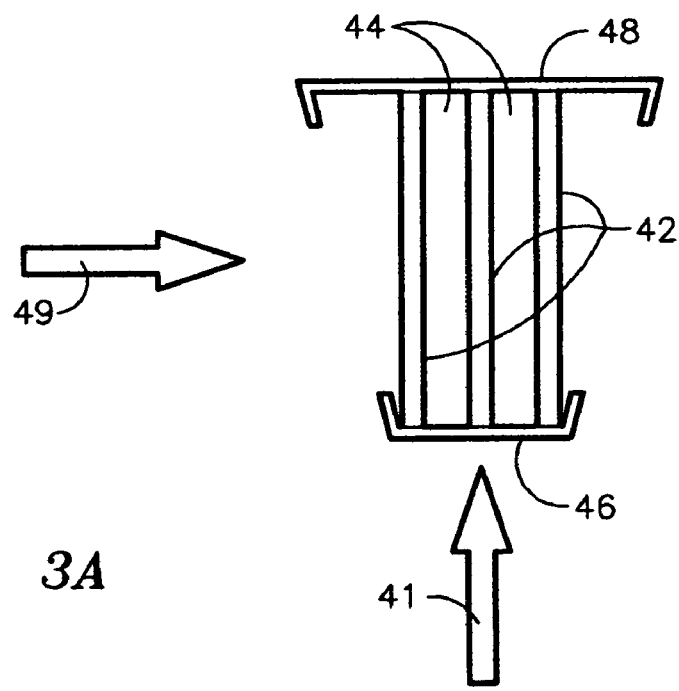
FIG. 3A shows details of the structure of the moving core of the present invention's preferred embodiment as depicted in FIG. 3.

FIGS. 3 and 4 illustrate two alternative moving core ring designs for use in particle beam targets, beam converters or dumps where the particles are capable of penetrating through the target and/or converter material. As shown in FIGS. 3 and 3A, energy absorber 40 is made from a series of parallel flat rings 42 separated by gap 44. Parallel flat rings 42 are attached by concentric short cylinder sections at inner edge 46 and outer edge 48 with apertures 47 that allow for coolant flow in the radial direction of arrow 41 that is parallel to flat rings 42 and directed toward the center of rings 42 or in the opposite direction. Forced coolant flow can be used as described herein. Such a design provides a constant target thickness for the incoming beam impacting the moving core from the direction indicated by arrow 49. Only a half section of energy absorber 40 is depicted in FIG. 3 for clarity. As is apparent, energy absorber 40 is rotated in the direction of arrow 37 or oppositely.

Figure 4A:
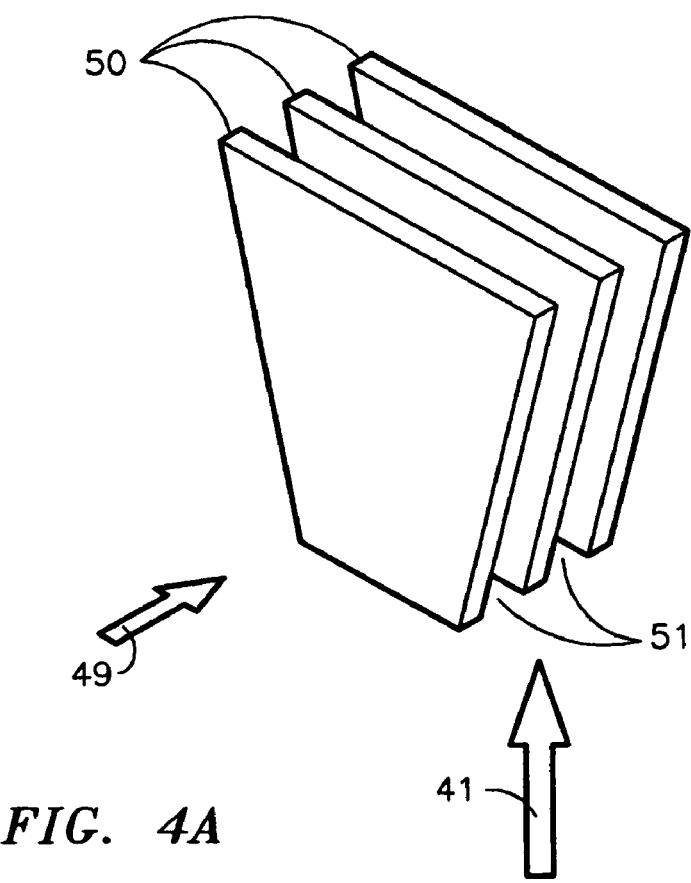
FIG. 4A shows details of the structure of the moving core of the present invention's alternative preferred embodiment as depicted in FIG. 4.

FIGS. 4 and 4A depict a similar energy absorber 54, comprised of multiple plates 50 separated by gaps 51, are each perpendicular to the ring plane and attached by a series of concentric rings 52. Such a design provides relatively better cooling capabilities and can be used in applications where uniformity of the target material is not critical, or when the full absorption of the beam is needed. Rotation is as described above. The incident beam direction 49 should be chosen such that several plates 50 are in its path, fully absorbing beam energy if necessary.

Figure 5:
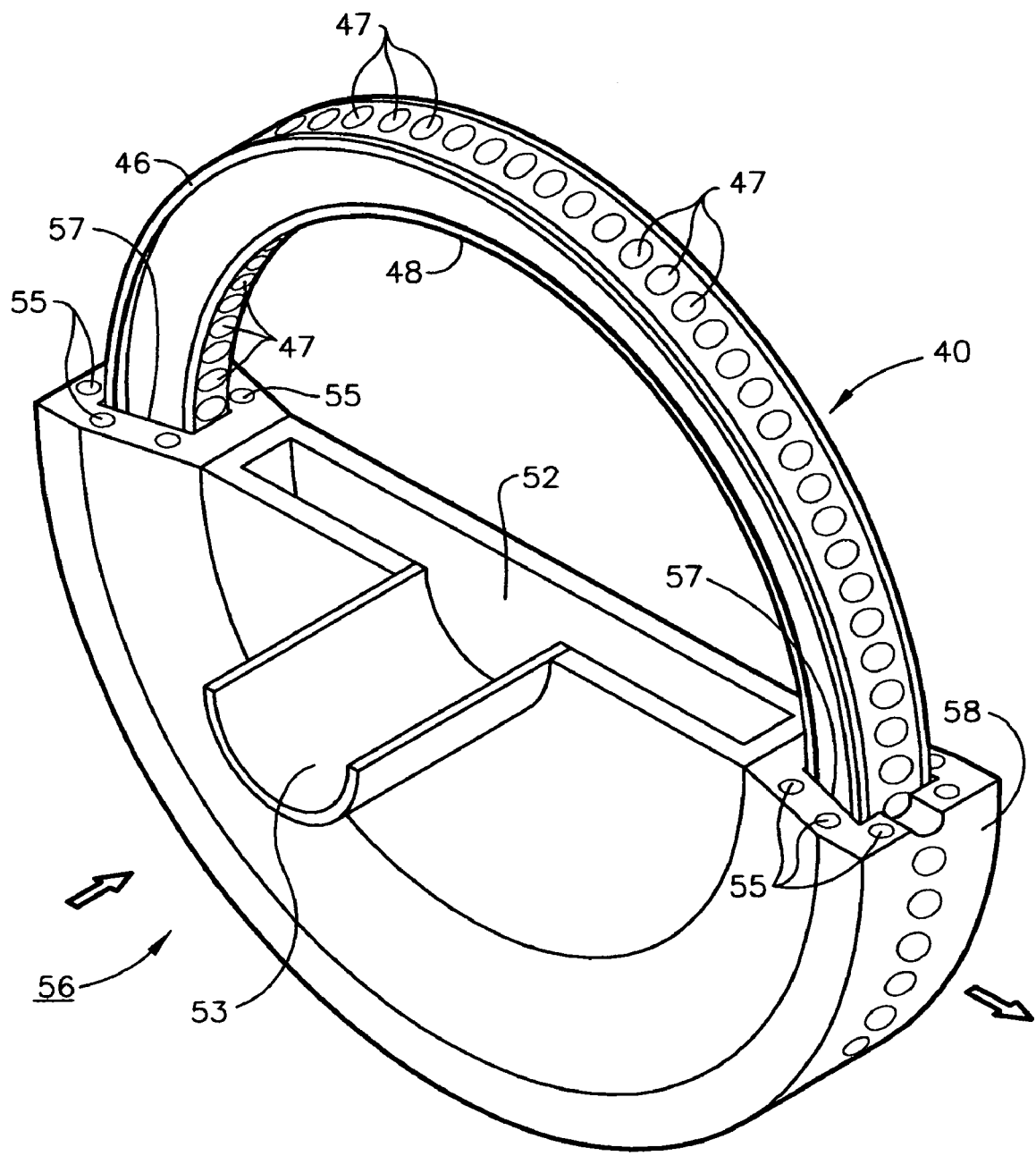
FIG. 5 is a partially cutaway perspective view of a fluid or gas cooled moving core energy absorber in accordance with the present invention.

Certain applications requiring higher energy absorption levels in the moving core devices of the present invention may require implementation of forced coolant flow in the system. For such purposes a special vessel enclosing all or a portion of the moving core can be implemented. FIG. 5 shows an illustration of such device 56 wherein the moving core energy absorber 40 of FIG. 3 rotates within a vessel or housing 58 having an inner volume 57 that is equipped with a system of interconnected apertures 55 for delivery and removal of a coolant supplied thereto by conduit 53 through inner volume 52.

In the embodiment depicted in FIG. 5, suspension and rotation of moving core 40 can be implemented by standard engineering systems comprised of rotors, shafts, bearings, magnetic elements, etc., all of which are well known in the art and not described further herein.

Figure 6:
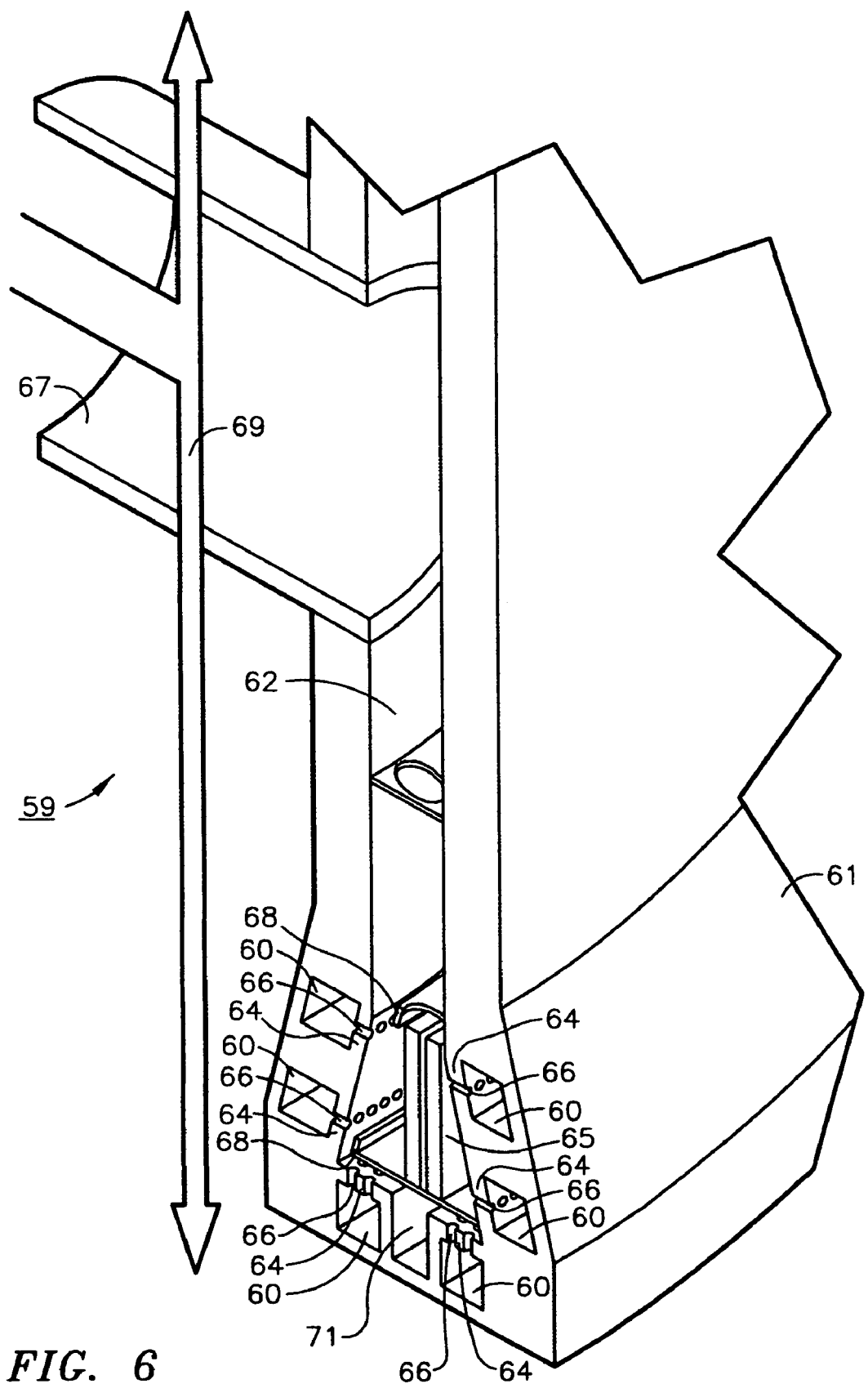
FIG. 6 is a cutaway view of a preferred alternative embodiment of a moving core energy absorber in accordance with the present invention.
Figure 7:
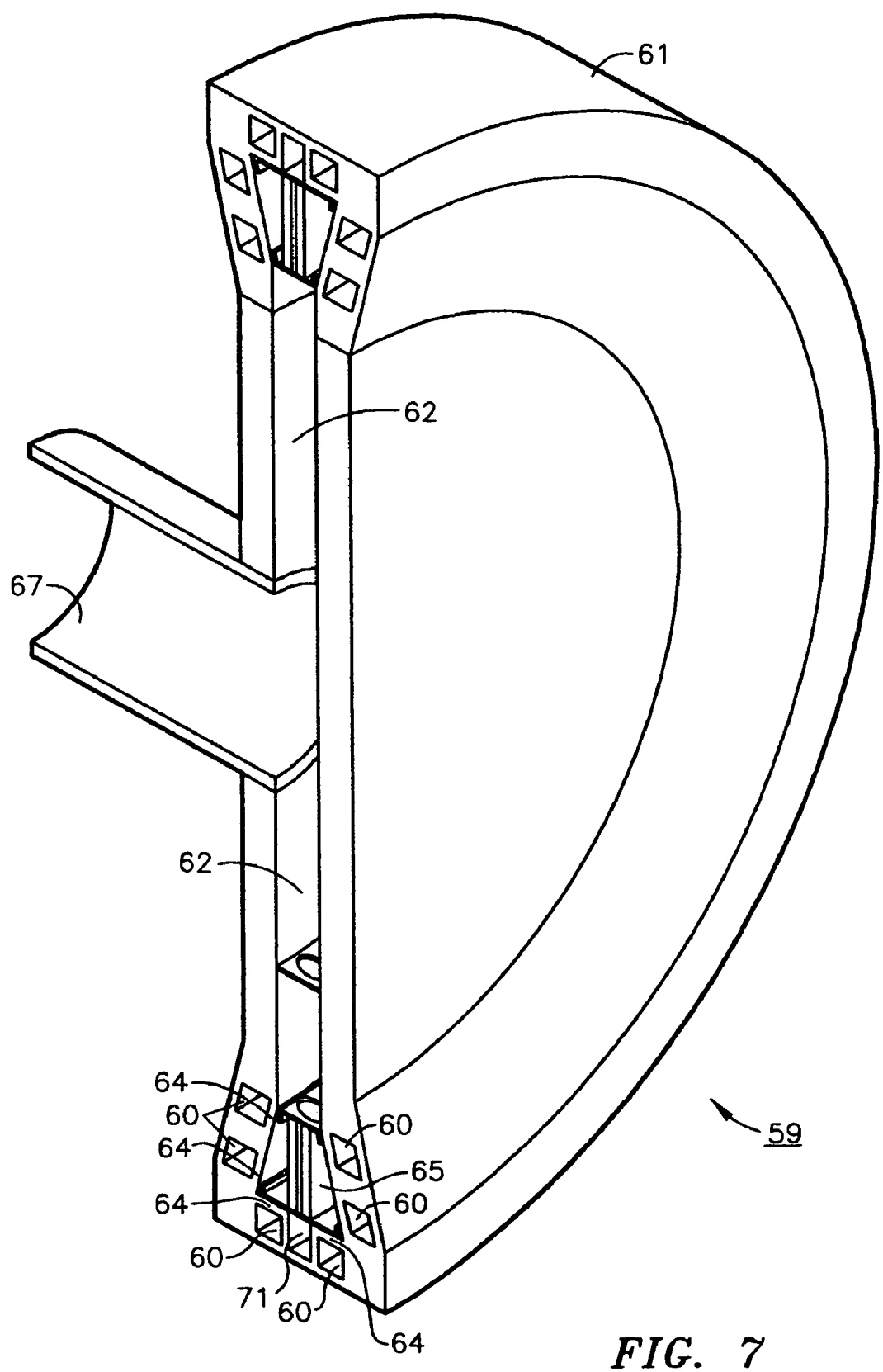
FIG. 7 is a cross sectional view of the moving core energy absorber of FIG. 6.
Figure 8:
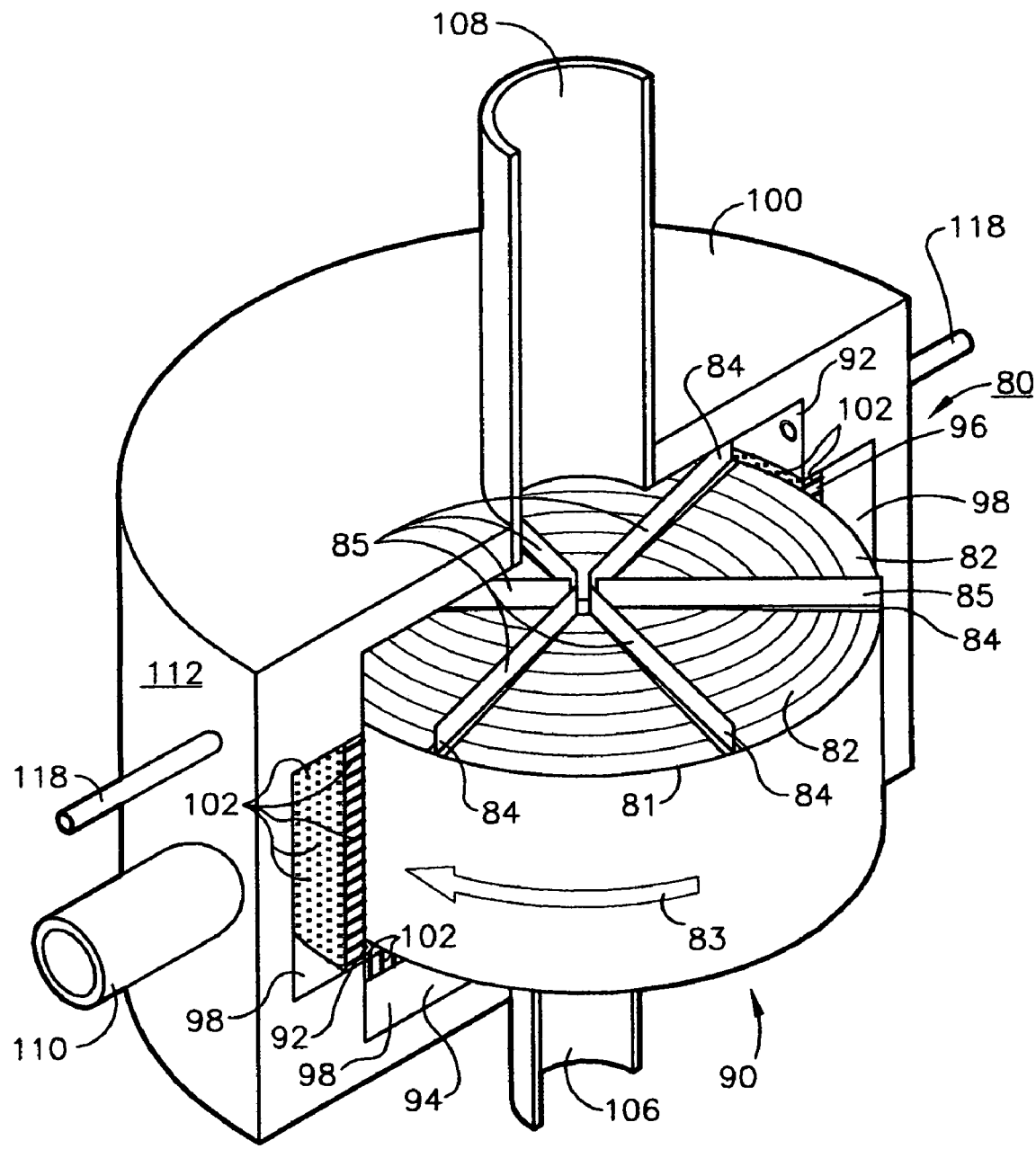
FIG. 8 is a cutaway view of a preferred high power accelerator beam dump in accordance with the present invention.
Figure 9:
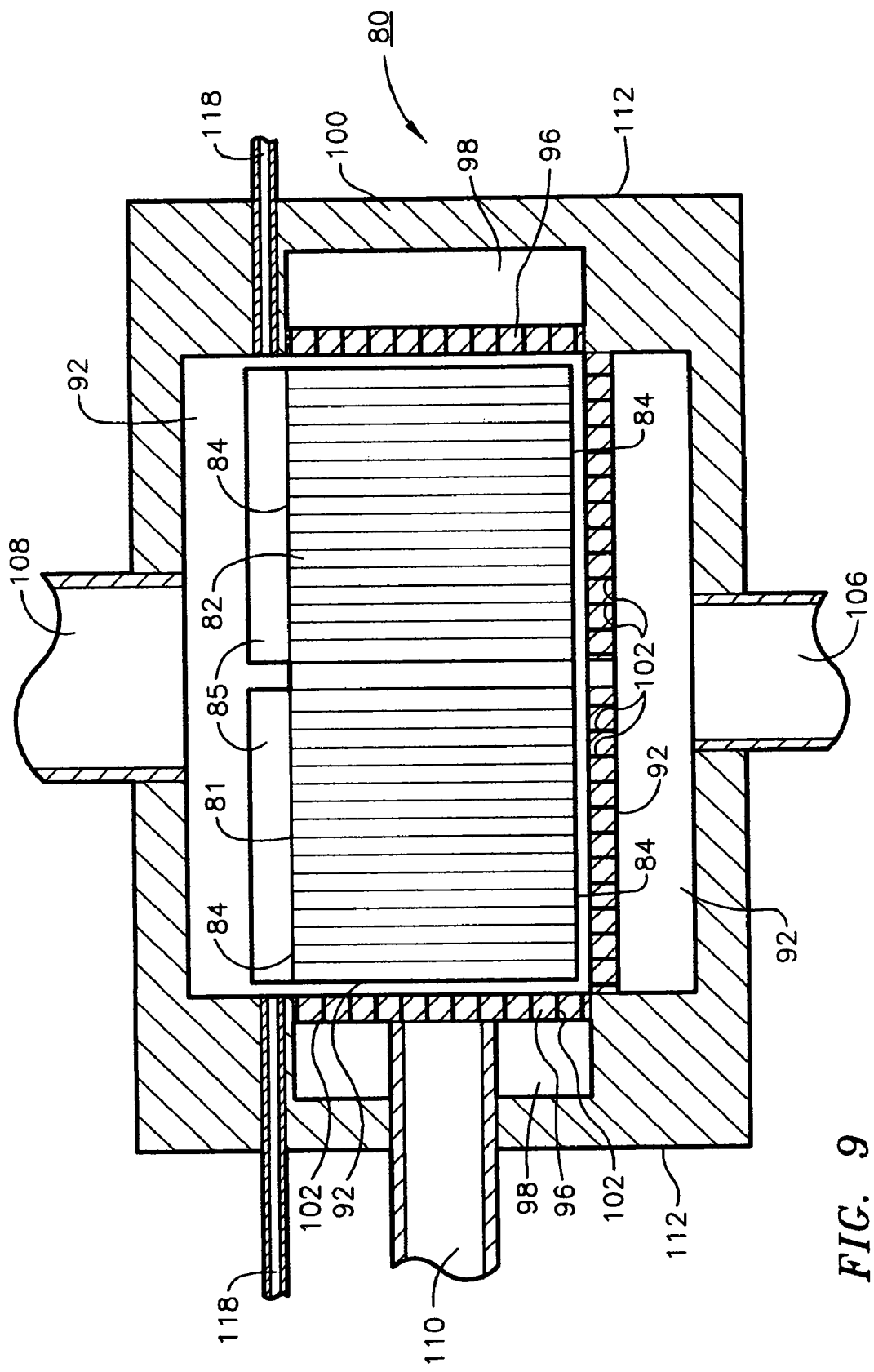
FIG. 9 is a cutaway view of the high power accelerator beam dump of FIG. 8, but showing certain additional internal details thereof.
Figure 10:
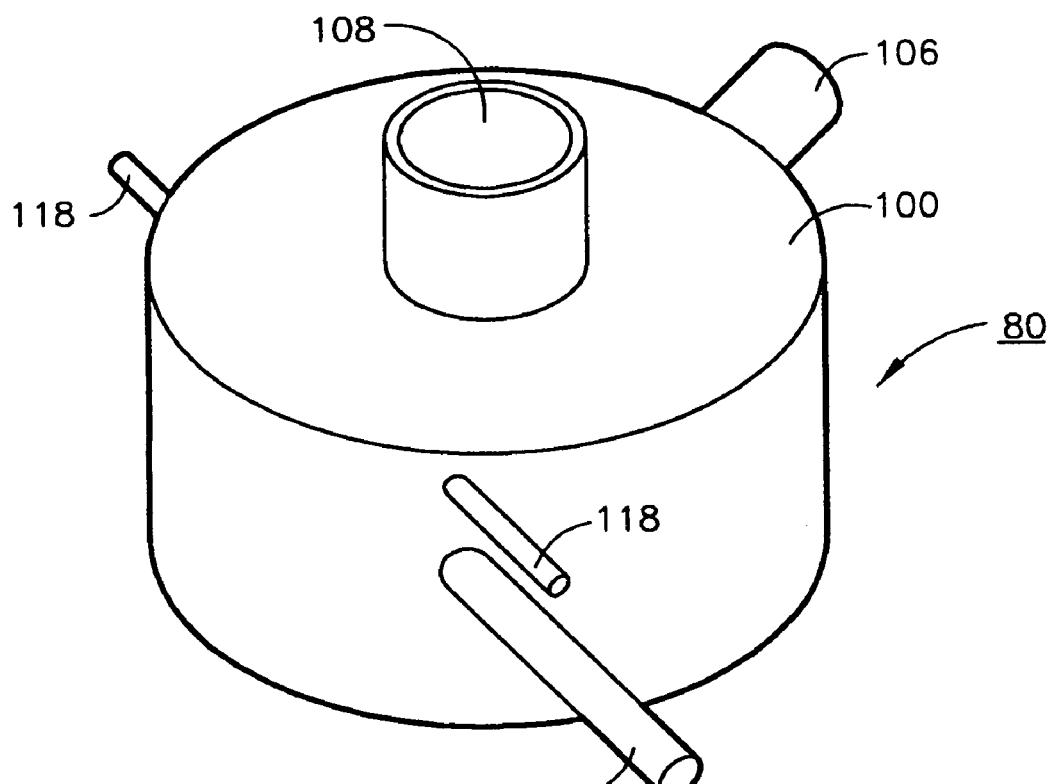
FIG. 10 is a top plan view of the beam dump of FIG. 8.
Figure 11:
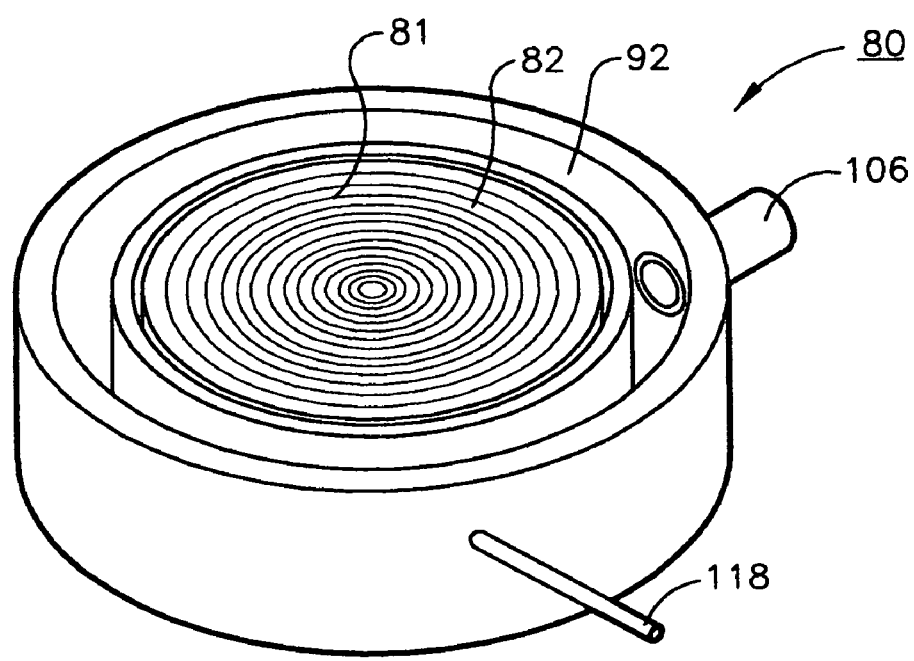
FIG. 11 is a top cutaway view of the beam dump of FIG. 8.

A highly preferred embodiment of the present invention uses an "air bearing" approach to suspend the moving core in a coolant flow. As shown in FIGS. 6 and 7, this embodiment of the moving core device 59 of the present invention includes high pressure chambers 60 in housing 61 connected to an inner volume 62 via walls 64 with a multitude of apertures 66. The high pressure chambers 60 are supplied externally with coolant flow at a pressure significantly higher than the pressure in the main coolant inlet 67, the inner volume 62 and the main coolant outlet 71. The moving core 65 of this embodiment may have a design corresponding to moving cores 40 and 54 or some other suitable core design. The shape of the moving core 65 surfaces 68 addressing walls 64 conform to the shape of walls 64, such that they are locally parallel, and the distance between them is small and constant in an equilibrium position of moving core 65. This condition provides the opportunity to stabilize the position of moving core 65 while allowing practically frictionless movement of the moving core along walls 64, much like the air hockey puck is stable vertically on an air hockey table, but moves freely in the two dimensions of the horizontal plane. The stability of moving core 65 in such an arrangement is achieved by the selecting the coolant pressures in the high pressure chambers 60 high enough to exert pressures at surfaces 68, comparable to or exceeding the weight of moving core 65. As is apparent to the skilled artisan, the value of the force in the air/coolant bearing depends non-linearly on the distance between the interface surfaces 68 and walls 64. Thus, it changes from virtually zero, when the distance is large enough and the pressure in the gap is not elevated, to the maximum equal to the product of the pressure in chambers 60 and the interface area, when the distance is small and the air/coolant is trapped in the gap, elevating the average pressure there almost to the level of the pressure in high pressure chamber 60. The strong non-linearity of the force as a function of the interface gap distance guarantees a solution in which the position of moving core 40 is stable, and moving core 40 is capable of moving in the flow of the coolant, parallel to itself, without mechanical contacts, practically without friction, and without violating the stability of its position.

The combinations of flat, cylindrical, conical, toroidal, or spherical shapes of surfaces 68 allows 1- or 2-dimensional movement of moving core 65 parallel to itself, such that the stability conditions remain in force. Controlled modulation of the coolant high pressures in high pressure chambers 60 allows for movement of moving core 65 in second or third dimensions.

Combinations of different coolants in high pressure chambers 60 and the low pressure line 67 can be used under certain conditions. For example, a high pressure water line can be used to feed high pressure chambers 60 and provide a "bearing" for moving core 65 motion, and the main coolant line 67 can use air flow. The two coolants will be mixed in the exhaust flow and may be either disposed of, or separated later for use in closed loops.

The rotating motion of moving core 65 in the embodiments shown in FIGS. 5-7 can be provided by motors of different types, or by the means of directing a portion of the coolant flow in a controlled way such that it transfers rotating momentum to moving core 65.

Another embodiment of the present invention is related to the design of high power beam dumps for use in high energy and high power accelerators. Important factors in such designs are compact design, reliability, containment of the produced radioactivity, and low cost of maintenance. Energy recovery may also become an issue in large scale installations. The present invention uses a similar, suitable moving core, suspended in a vessel with a corresponding inner volume using the air-bearing technique, to achieve desirable operational parameters of the beam dump. The moving core absorber device 80 of the present invention in accordance with the embodiment illustrated in FIGS. 8-11 comprises a moving core 90 that is designed as an assembly of a multitude of thin metal (or other heat shock-resistant materials such as carbon fibers, silicon carbide, etc.) concentric cylinders 81, arranged such that the coolant flow passes through the gaps 82. Cylinders 81 are held in place mechanically by a series of narrow flat horizontal radial plates 84 at the bottom and at the top of the assembly, similar to wheel spokes.

The details of material choice, dimensions, and possible additional inner structure of the moving core 90 depends on the parameters of the application. In particular, for the applications where a compact solution is desirable, the design of moving core 90 is made denser by filling gaps 82 between cylinders 81 with additional material. For example, by filling gaps 82 with metal balls that provide a dense medium with excellent thermal shock resistance. Filling gaps 82 with fissionable material creates an opportunity to use the design of FIGS. 8-11 as a nuclear fuel container in accelerator-induced nuclear fission energy generators. Spreading any incident particle beam evenly through the volume of moving core 90 by rotation thereof solves the problem of a uniform burnout of such fissionable fuel, avoiding local overheating, and generally increasing the maximum output of such an energy generator.

In this embodiment, moving core 90 is placed in cylindrical inner volume 92 with its radial dimension slightly larger than moving core 90's outer radius and is induced to rotate in either direction such as that indicated by arrow 83. The bottom and the side walls 94 and 96 of inner volume 92 separate it from the side and the bottom high pressure chambers 98 within the body of the vessel 100. A multitude of the blow holes 102 in walls 94 and 96 provide the coolant flow that performs the function of an air bearing for maintaining core 90 suspended in the coolant flow, and the function of providing the main coolant flow through gaps 82. Blow holes 102 are azimuthally-uniformly located small holes present in large numbers through the walls 94 and 96, similar to the blow holes in an air hockey table. The purpose of blow holes 102 is to maintain a constant flow of streaming coolant from the high pressure volumes to the inner volume while maintaining the pressure difference. In this configuration, the "hockey puck", i.e. moving core 90, rides on the multitude of small coolant streams exiting from blow holes 102. Since the pressure rises dramatically and non-linearly when the distance between the interface surfaces of walls 94 and 96 and the outer surfaces of moving core 90 becomes small, the coolant flow maintains an equilibrium that keeps moving core 90 in a floating position. To support moving core 90 in a stable floating position, adequate sum apertures of blow holes 102 between high pressure chambers 98 and inner volume 92 and adequate coolant pressure must be provided to keep moving core 90 afloat. The location and dimensions of such features and the necessary pressures are well within the capabilities of the skilled artisan and thus are not described further herein. The multitude of blow holes 102 in the side wall provides the forces to keep moving core 90 in a stable centered position in inner volume 92. The coolant is supplied through inlet 106 in the bottom and side high pressure chambers 98, and is taken from the system through outlet port 108 in inner volume 92. If desirable and practical, hot gaseous coolant exiting through outlet port 108 can be used in gas turbines to recover a portion of the energy absorbed in vessel 100. The particle beam is delivered to moving core 90 via beam line 110 that passes horizontally through the outer walls 112 and inner walls 96 of vessel 100. The mechanism to move moving core 90 and to control its rotation are motors of different types, or, as shown in the FIGS. 8-11, directional high pressure coolant lines 118 that direct coolant at vertical fins 85 mounted on top of moving core 90 so as to impart rotational movement thereto.

The choice of dimensions, materials, and coolant for the apparatus just described are determined by the type of particle beam, maximum design beam energy, and maximum design output power.

Advantages of the various embodiments described herein include:
1) higher limits on maximum absorbed beam power;
2) compact design;
3) the opportunity to use air, or other gaseous coolants as the cooling medium in high power beam dumps, to minimize chemical aggressiveness and lower radioactive activation of the coolant, and the opportunity to recover part of the exchanged beam energy in gas turbines;
4) the avoidance of non-uniform burnout of fissionable fuel, avoiding local overheating, and generally increasing maximum output of accelerator-induced fission energy generators.

The list of possible applications of the apparatus described herein includes: laser, and particle accelerator beam targets; absorbers; converters; and dumps designed for various energy ranges. The method can be used as an effective design solution for cooling irradiation targets in the isotope production processes, for cooling spallation targets in neutron irradiation facilities, and as a method of uniform irradiation of fissionable fuel and extracting energy in accelerator-induced fission energy generators.

In the various embodiments described herein, some outer surfaces of the moving cores are generally cylindrical and the motion of the moving cores is described as generally rotational. As the invention has been described, it will be apparent to those skilled in the art that other designs of moving cores are possible. Generally spherical or toroidal shapes of moving cores and corresponding parallel interface surfaces of the enclosing volume would allow the rotational motion of the moving core in the same manner as described above. Generally flat surfaces of moving cores and the corresponding parallel interface surfaces of the enclosing volumes would allow linear motion of the moving cores along the interface surfaces, achieving the same general goals of spreading the beam impact zone and absorbing and transferring beam energy efficiently.

As the invention has been described, it will be apparent to those skilled in the art that the same may be varied in many ways without departing from the intended spirit and scope of the invention, and any and all such modifications are intended to be included within the scope of the appended claims.

What is claimed is:

1. An energy absorber for the prevention of overheating of laser or particle beam impact zones comprising:
   A) a generally cylindrical energy absorbing core having a periphery;
   B) a laser or particle beam energy absorbing surface about the periphery that is impacted by a laser or particle beam whose energy is to be absorbed;
   C) a mechanism for rotating the generally cylindrical core wherein the core is rotated in the absence of mechanical contacts with the core; and
   D) a mechanism for cooling the laser or particle beam energy absorbing surface wherein the mechanism for cooling comprises a coolant in direct contact with the core.

2. The energy absorber of claim 1 for the prevention of overheating of laser beam impact zones wherein the laser beam energy absorbing surface comprises a radially disposed and pleated or unpleated array of laser light absorbing and thermoconductive plates.

3. The energy absorber of claim 2 wherein the laser light absorbing and thermoconductive plates forming the pleated array are abutting and each has a first edge attached to the cylindrical core and opposed sharp side edges generally orthogonal to the first edge and pleating is achieved by joining alternating opposed sharp side edges of abutting laser light absorbing and thermoconductive plates.

4. The energy absorber of claim 2 wherein the rotating laser beam absorbing surface comprises a radially disposed array of laser light absorbing and thermoconductive plates having gaps therebetween.

5. The energy absorber of claim 1 wherein the generally cylindrical core has opposing planar side surfaces parallel to the major plane of the generally cylindrical core, the laser beam energy absorbing surface comprises a layer of laser beam energy absorbing material one of the opposing planar side surfaces and the other opposing planar side surface has a cooling mechanism comprising a series of orthogonally extending cooling fins extending therefrom.

6. The energy absorber of claim 2 wherein the radially disposed and pleated or unpleated array of laser light absorbing and thermoconductive plates is unpleated and further including a housing and a mechanism for floating the rotating laser beam absorbing core on a cushion of coolant within the housing.

7. The energy absorber of claim 6 wherein the mechanism for floating the rotating core and the attached laser beam energy absorbing surface on a cushion of coolant within the housing comprises:
   A) a coolant inlet;
   B) an inner chamber having top, bottom and side walls encompassing the rotating core;
   C) a high pressure chamber receiving coolant from the coolant inlet and directing it to the inner chamber under sufficient pressure as to support the rotating core between the top, bottom and side walls of the inner chamber; and
   D) a coolant outlet.

8. The energy absorber of claim 1 for the prevention of overheating of particle beam impact zones comprising:
   A) a housing:
   B) a rotating particle beam absorbing core comprising a series of nested concentric cylinders of particle beam absorbent material having gaps therebetween rotatably mounted within the housing;
   C) a mechanism for providing a flow of coolant into the housing and through the gaps; and
   D) a particle beam pipe providing access to the rotating particle beam absorbing core from outside of the housing.

9. The energy absorber of claim 8 for the prevention of overheating of particle beam impact zones further comprising a mechanism for floating the particle beam absorbing core on a cushion of coolant within the housing.

10. The energy absorber of claim 9 for the prevention of overheating of particle beam impact zones wherein the a mechanism for floating the particle beam absorbing core on a cushion of coolant within the housing comprises:
    A) a coolant inlet;
    B) an inner chamber within the housing having top, bottom and side walls and encompassing the rotating particle beam absorbing core;
    C) a high pressure chamber receiving coolant from the coolant inlet and directing it to the inner chamber under sufficient pressure as to support the rotating particle beam absorbing core between the top, bottom and side walls of the inner chamber; and
    D) a coolant outlet.

11. The energy absorber of claim 9 for the prevention of overheating of particle beam impact zones further including a mechanism for driving the rotation of the rotating particle beam absorbing core with coolant circulating within the inner chamber.

12. The energy absorber of claim 9 for the prevention of overheating of particle beam impact zones wherein the a mechanism for driving the rotation of the rotating particle beam absorbing core comprises rotation control flow pipes that permit the introduction of a directed flow of coolant into and out of the inner chamber to induce rotation of the rotating particle beam absorbing core.

* * * * *